United States Patent
Schulz

(10) Patent No.: US 10,739,572 B2
(45) Date of Patent: Aug. 11, 2020

(54) ELONGATING A TRAVEL PATH OF A LIGHT BEAM BY AN OPTICAL DELAY DEVICE

(71) Applicant: TRUMPF Lasersystems for Semiconductor Manufacturing GmbH, Ditzingen (DE)

(72) Inventor: Joachim Schulz, Gerlingen (DE)

(73) Assignee: TRUMPF Lasersystems for Semiconductor Manufacturing GmbH, Ditzingen (DE)

(*) Notice: Subject to any disclaimer, the term of this patent is extended or adjusted under 35 U.S.C. 154(b) by 289 days.

(21) Appl. No.: 15/434,487

(22) Filed: Feb. 16, 2017

(65) Prior Publication Data

US 2017/0160527 A1    Jun. 8, 2017

Related U.S. Application Data

(63) Continuation of application No. PCT/EP2014/067719, filed on Aug. 20, 2014.

(51) Int. Cl.
  *G02B 17/00* (2006.01)
  *G02B 17/02* (2006.01)
  (Continued)

(52) U.S. Cl.
  CPC ......... *G02B 17/023* (2013.01); *G02B 17/002* (2013.01); *G02B 17/004* (2013.01);
  (Continued)

(58) Field of Classification Search
  CPC .. G02B 17/002; G02B 17/004; G02B 17/006; G02B 17/023; H01S 3/05
  (Continued)

(56) References Cited

U.S. PATENT DOCUMENTS 4,202,605 A * 5/1980 Heinz .................. G02B 26/06
                                                         359/845
4,904,073 A * 2/1990 Lawton .................. G02B 5/09
                                                         359/851
(Continued)

FOREIGN PATENT DOCUMENTS

DE    102010000032 A1    8/2010
JP      2006337861 A    12/2006
(Continued)

OTHER PUBLICATIONS

International Search Report from corresponding PCT Application No. PCT/EP2014/067719, dated May 7, 2015, 8 pages.
(Continued)

*Primary Examiner* — Robert Tavlykaev
(74) *Attorney, Agent, or Firm* — Fish & Richardson P.C.

(57) ABSTRACT

Methods, devices, and systems for elongating a beam path of a light beam, in particular of a laser beam, are provided. An example method includes coupling the light beam into an interspace between a plurality of first reflective surfaces and a plurality of second reflective surfaces facing the first reflective surfaces, multiply reflecting the light beam between the first reflective surfaces and the second reflective surfaces to elongate the beam path of the light beam, and coupling out the light beam from the interspace. The light beam undergoes the steps of coupling in, repeated reflecting and coupling out at least a first time with a first pass and a second time with a second pass, and the light beam traverses a different beam path in the interspace during the first pass in comparison with during the second pass.

21 Claims, 4 Drawing Sheets

(51) Int. Cl.
*H01S 3/00* (2006.01)
*G01N 21/03* (2006.01)
*H01S 3/23* (2006.01)
*H01S 3/223* (2006.01)
*G01N 21/39* (2006.01)

(52) U.S. Cl.
CPC ............ *G02B 17/006* (2013.01); *H01S 3/005* (2013.01); *G01N 21/031* (2013.01); *G01N 21/39* (2013.01); *G01N 2021/391* (2013.01); *H01S 3/0064* (2013.01); *H01S 3/2232* (2013.01); *H01S 3/2316* (2013.01); *H01S 2301/02* (2013.01)

(58) Field of Classification Search
USPC ...................................... 372/93, 94, 99, 700
See application file for complete search history.

(56) References Cited

U.S. PATENT DOCUMENTS

| | | | | |
|---|---|---|---|---|
| 6,392,791 | B1* | 5/2002 | Fork | H01S 3/2316 |
| | | | | 359/346 |
| 7,146,069 | B1* | 12/2006 | Bowers | G02B 6/2861 |
| | | | | 385/18 |
| 7,742,172 | B2* | 6/2010 | Cluff | G01N 21/3581 |
| | | | | 356/455 |
| 2005/0220164 | A1* | 10/2005 | Mori | H01S 3/005 |
| | | | | 372/92 |
| 2007/0001131 | A1 | 1/2007 | Ershov et al. | |
| 2007/0047601 | A1* | 3/2007 | Yu | H01S 3/235 |
| | | | | 372/25 |
| 2008/0304125 | A1* | 12/2008 | Hsu | G02B 17/004 |
| | | | | 359/223.1 |
| 2009/0080476 | A1* | 3/2009 | Partlo | G03F 7/70341 |
| | | | | 372/25 |
| 2009/0095925 | A1 | 4/2009 | Ershov et al. | |
| 2012/0170112 | A1 | 7/2012 | Sandstrom | |
| 2012/0229889 | A1* | 9/2012 | Suganuma | B82Y 20/00 |
| | | | | 359/344 |
| 2013/0250402 | A1 | 9/2013 | Nowak et al. | |

FOREIGN PATENT DOCUMENTS

| | | |
|---|---|---|
| WO | WO0075631 A1 | 12/2000 |
| WO | 2012091786 | 7/2012 |
| WO | WO2012094786 A1 | 7/2012 |

OTHER PUBLICATIONS

Notification of Transmittal of translation of the International Preliminary Report on Patentability and the Written Report of the International Searching Authority for corresponding PCT Application No. PCT/EP2014/067719, dated Mar. 2, 2017, 26 pages.

* cited by examiner

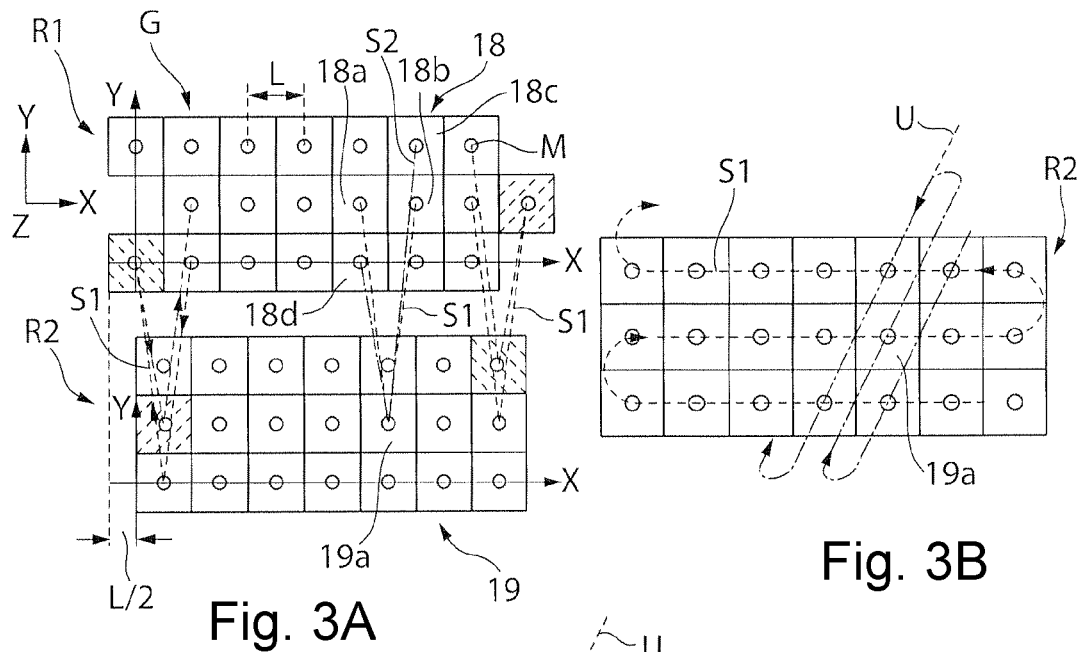
Fig. 3A
Fig. 3B
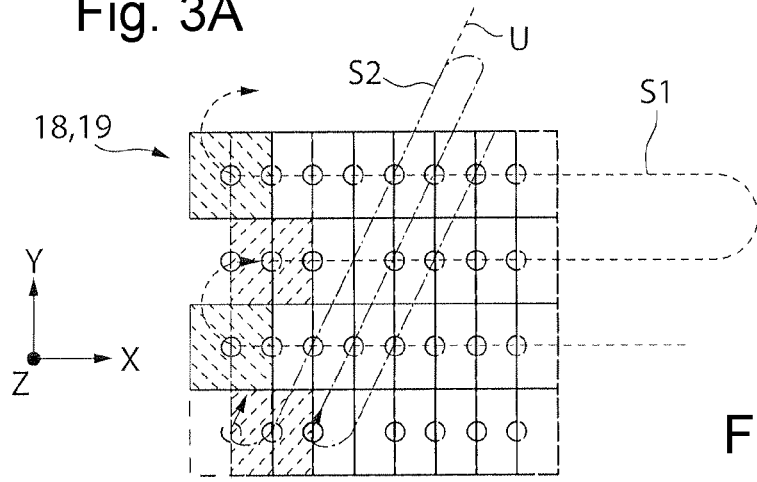
Fig. 4A
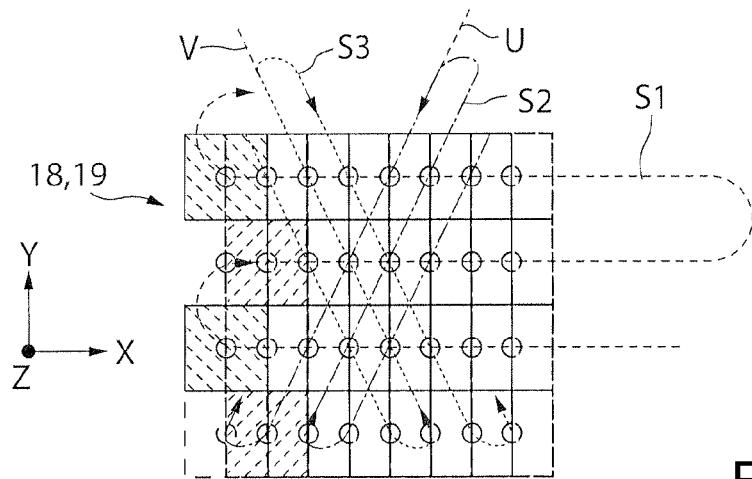
Fig. 4B

ELONGATING A TRAVEL PATH OF A LIGHT BEAM BY AN OPTICAL DELAY DEVICE

CROSS-REFERENCE TO RELATED APPLICATION

This application is a continuation of and claims priority under 35 U.S.C. § 120 to PCT Application No. PCT/EP2014/067719 filed on Aug. 20, 2014. The entire contents of this priority application are incorporated herein by reference.

TECHNICAL FIELD

The present invention relates to methods, devices, and systems for elongating a beam path of a light beam, in particular of a laser beam.

BACKGROUND

WO 2012/091786 A1 disclosed an optical delay device for elongating a beam path of a light beam. The delay device has exactly one input for coupling a light beam into an interspace and exactly one output for coupling out a light beam from the interspace. The first and second pluralities of reflective surfaces are arranged and aligned relative to one another in such a way that a superimposition of two or more optical beams at each of the optical surfaces is avoided when passing through the interspace between the input and the output.

Such an optical delay device can be used for example in a driver laser arrangement for an EUV light source, as described in US 2009/0095925 A1. The driver laser arrangement described therein has a beam source for generating pulsed laser radiation and one or more optical amplifiers for amplifying the pulsed laser radiation. The beam source of the driver laser arrangement serves for generating so-called seed pulses, which are amplified to high laser powers of several kW, if appropriate of 10 kW or more, in the optical amplifier or optical amplifiers. The laser radiation amplified by the driver laser arrangement is fed via a beam guiding device to a focusing device, which focuses the laser radiation or the laser beam in a target region. A target material is provided in the target region and undergoes transition to a plasma state upon irradiation with the laser beam and emits EUV radiation in the process.

In the case of the driver laser arrangement described above, the amplified laser radiation can be reflected for example at the target material, which may be present, e.g., in the form of tin droplets. The back-reflection generated at such a droplet passes back into the optical amplifier or optical amplifiers and passes through the gain medium present there, such that the back-reflection is also amplified in the optical amplifier or optical amplifiers. Even a weak back-reflection possibly suffices to generate, after amplification in the gain medium of the optical amplifier, a power that can damage optical or, if appropriate, mechanical components in the optical amplifier or in the beam path upstream of the optical amplifier, e.g., in the beam source.

In order to prevent the reflected, returning pulse from entering the beam source, it is possible to arrange, for example between the beam source and one of the optical amplifiers, an optical switch or a switchable diaphragm which closes the beam path of the laser beam, such that the returning laser pulse is blocked and cannot enter the beam source. Moreover, it may be advantageous to close the beam path of the laser beam between two successive pulses propagating in the direction of the target material, in order to prevent a stable optical axis from being established at which ASE ("amplified spontaneous emission") or parasitic self-lasing (at scattering locations) may form.

Since optical switches require a certain time period to block the beam path for the laser beam after the passage of a pulse, it is advantageous to provide an optical delay device in the beam path downstream or, if appropriate, upstream of an optical switch, which optical delay device elongates the beam path of the laser beam and thus increases the travel time of the laser beam. In an optical delay device, the beam path is elongated by more than 100 m, if appropriate, which can be realized by a tight folding or by a multiplicity of reflections between the reflective surfaces. In order to ensure a sufficient elongation of the beam path, optical delay devices typically require a comparatively large structural space.

SUMMARY

The present invention discloses a method of elongating a beam path of a light beam, an optical delay device, and a driver laser arrangement for an EUV light source, which make possible a comparatively large elongation of the beam path in conjunction with a comparatively small structural space required.

One aspect of the invention features a method of elongating a beam path of a light beam, comprising: coupling the light beam into an interspace between a plurality of first reflective surfaces and a plurality of second reflective surfaces facing the first reflective surfaces; multiply reflecting the light beam between the first reflective surfaces and the second reflective surfaces to elongate the beam path of the light beam; and coupling out the light beam from the interspace. The light beam undergoes the steps of coupling in, repeated reflecting and coupling out at least a first time with a first pass and a second time with a second pass, and the light beam traverses a different beam path in the interspace during the first pass in comparison with during the second pass.

The invention proposes that the light beam pass through the optical delay device at least twice along different beam paths. Within the meaning of this application, different beam paths are not understood to be the inversion of the beam direction, that is to say that the light beam passes through the interspace during the at least two passes on at least two different geometrical beam paths and not along one and the same beam path (in the opposite direction), as would be the case, e.g., for polarization separation.

The passage of the light beam through the interspace at least twice makes it possible to alter the light beam in terms of its properties between the first pass and the second pass, for example to amplify the light beam or to manipulate other properties (e.g. polarization, divergence, wavelength, . . . ) of the light beam. Moreover, between the two passes the light beam can, e.g., pass through an optical diode or, if appropriate, be altered by active optical elements, e.g., by acousto-optical modulators (AOMs), electro-optical modulators (EOMs), amplifiers, or passive optical elements such as beam telescopes, optical diodes, apertures, etc., for example by the laser beam being trimmed, in particular trimmed marginally. It goes without saying that the light beam need not necessarily be altered between the first and second passes; rather, after the first pass the light beam can merely be deflected from an output of the delay device to an input of the delay device in order to pass through the latter once again.

It is possible to configure the first and second reflective surfaces in the form of individual mirrors, which are typically applied on a common carrier structure. It is advantageous, however, to configure the reflective surfaces in the form of mirror facets of a facet mirror, which are typically arranged or formed on a carrier structure in the form of a common substrate. The reflective surfaces can be configured on a planar surface of the carrier structure, but it is also possible for the surface of the carrier structure on which the reflective surfaces are formed to have an e.g. concave curvature.

A group of first and second reflective surfaces, the number of which is more than 50%, preferably more than 80%, of the total number of reflective first and second surfaces, can have the same alignment, that is to say that the normal directions of this group of the first and second reflective surfaces correspond. The first reflective surfaces and the second reflective surfaces of this group can be arranged in particular along two parallel planes that run perpendicular to the respectively identical normal directions. The first and second reflective surfaces can have a typically concave or, if appropriate, convex (typically spherical) curvature. In this case, the normal directions run through center points or the vertices of the reflective surfaces.

In one variant, the light beam is reflected at (or by) at least one of the first or of the second reflective surfaces both during the first pass and during the second pass. In this case, the light beam passes through one, typically a plurality, of the first and/or second reflective surfaces doubly, i.e., both during the first pass and during the second pass, that is to say that said light beam is reflected at the respective surfaces. With the aid of reflective surfaces through which the light beam passes doubly, the number of reflective surfaces required for elongating the beam path can be reduced and structural space can thus be saved.

Alternatively, it is also possible for the first and second reflective surfaces through which the beam path of the light beam passes during the first pass in the optical delay device to differ from the first and second reflective surfaces through which the beam path of the light beam passes during the second pass, that is to say that in this case the light beam passes doubly through none of the reflective surfaces. In this case, too, it is possible to realize a delay device which occupies only a slightly larger structural space as a result of the double pass, but nevertheless enables a considerable elongation of the beam path. In both cases, even with a double pass, the outlay for the mounting and adjustment mechanisms is incurred only once, and so the delay device can be realized more compactly than would be the case with two separate delay devices.

In a further variant, at least one of the reflective first surfaces is imaged onto a further reflective first surface during the reflection of the light beam at one of the reflective second surfaces (and vice versa). By multiply imaging the light beam onto itself, it is possible to prevent the diameter of the light beam from increasing within the interspace or within the delay device. For the purpose of imaging, the first reflective surfaces can be concavely curved. The second reflective surfaces can likewise be concavely or, if appropriate, convexly curved. For details regarding the curvature of the reflective surfaces for realizing multiple imaging, reference is made to WO 2012/091786 A1 cited in the introduction, which is incorporated by reference in the content of this application with regard to this aspect.

In one advantageous variant, the plurality of first reflective surfaces and the plurality of second reflective surfaces are arranged in a first grid and in a second grid, in which the light beam passes preferably in a meandering fashion. The two grids in each case form a regular arrangement of reflective surfaces which are arranged along the grid or lattice network, that is to say that the center points of the individual reflective surfaces are arranged at identical distances from one another. It goes without saying that such a grid need not be continuous; rather, individual reflective surfaces can be omitted particularly at the edge of the grid. By way of example, in the case of a square perimeter geometry of the reflective surfaces, the center points of the surfaces can form a square grid, in the case of which a respective center point is at the same distance from four center points arranged in a respectively adjacent row and/or column. In the case of first and second reflective surfaces having a hexagonal perimeter geometry, the reflective surfaces are typically arranged in a hexagonal grid. The geometry of the grid may depend on the perimeter geometry of the first and second reflective surfaces, as described above, but this is not necessarily the case. In this regard, by way of example, even in the case of an (approximately) rectangular perimeter geometry of the individual reflective surfaces, an arrangement of the reflective surfaces in a hexagonal grid may be advantageous.

The light beam passes through the grid preferably in a meandering fashion, that is to say that the light beam passes through the reflective surfaces along a predefined direction that is maintained during a pass of the light beam. Only at the edge of the grid is the light beam deflected out of the predefined direction in order to pass through the grid once again in a laterally offset manner along the predefined direction (with an inverted beam direction). The meandering pass enables the light beam to pass through as many of the first and second reflective surfaces as possible, ideally all of said surfaces, during a pass.

In order to simplify the passage of the light beam along the first and second grids, it has proved to be advantageous if the first and second grids and thus the center points of the first and second reflective surfaces are arranged offset with respect to one another in a direction perpendicular to the common normal directions (see above). The offset between the two grids is typically an integer fraction, generally half, of the distance between adjacent center points of the reflective surfaces. The direction along which the offset is effected generally runs along a row or a column of a respective grid.

In one development, a direction along which the light beam passes through the first and second reflective surfaces of the first and second grids in a meandering fashion during the first pass differs from a direction along which the light beam passes through the first and second reflective surfaces of the first and second grids in a meandering fashion during the second pass. The directions along which the at least two meandering passes take place are rotated with respect to one another and may form for example an angle of 90° or of 60° with respect to one another. The rotated meandering pass makes it possible, in particular, to align the plurality of the first and second reflective surfaces parallel or with the same normal direction with respect to one another and nevertheless to enable a multiple pass in which the beam paths do not correspond.

In one variant, during the first pass, the light beam is reflected from one of the first reflective surfaces to one of the second reflective surfaces and back from the latter to a further, adjacent first reflective surface, and wherein, during the second pass, the light beam is reflected from one of the first reflective surfaces to the same second reflective surface and back from the latter to a further, non-adjacent first reflective surface. It goes without saying that the second pass need not necessarily follow the first pass temporally, that is to say that the temporal order of the first and second passes is arbitrary. During the first pass, the light beam passes through the first and second reflective surfaces of a grid typically in rows or in columns (in particular in a meandering fashion), that is to say that the reflections take place between adjacent reflective optical surfaces (with minimum distance between the (surface) center points). During the second pass, by contrast, the reflections typically take place between non-adjacent first and second reflective surfaces, that is to say that the light beam typically passes through the first and second reflective surfaces at an angle with respect to the rows or columns of the grid along which the reflective surfaces are at a minimum distance from one another.

The adjacent first reflective surfaces can be arranged, in particular, in the same row (or column) of the first grid as the second reflective surface of the second grid. The non-adjacent first surfaces of the first grid can be arranged in two rows (or columns) of the first grid which are arranged adjacent to the row (or column) of the second grid with the second reflective surface and which lie for example directly above or directly below the row of the second grid in which the second reflective surface is arranged.

In particular, during a third pass, the light beam can be reflected from one of the first reflective surfaces to the same second reflective surface and back from the latter to a non-adjacent first reflective surface, wherein the first reflective surface and the further first reflective surface during the third pass do not correspond to the first reflective surface and the further first reflective surface during the second pass. In this case, the light beam passes through the reflective surfaces along a different direction during the third pass compared with during the second pass. In this way, it is possible to realize a triple pass of the light beam through the optical delay device with three respectively different beam paths.

Another aspect of the invention features an optical delay device for elongating a beam path of a light beam, comprising: a plurality of first reflective surfaces; a plurality of second reflective surfaces facing the first reflective surfaces; at least one input for coupling the light beam into an interspace formed between the first reflective surfaces and the second reflective surfaces; and at least one output for coupling out the light beam from the interspace after the elongating of the beam path of the light beam by multiple reflections at the first reflective surfaces and at the second reflective surfaces. The optical delay device is configured to guide the light beam between the at least one input and the at least one output on at least two different (geometrical) beam paths through the interspace between the first and second reflective surfaces. As was described further above, the realization of two or more geometrical beam paths makes it possible to reduce the structural space of the optical delay device that is required for the elongation of the beam path.

In one advantageous embodiment, a group of first and second reflective surfaces, the number of which is more than 50%, preferably more than 80%, of the total number of reflective first and second surfaces, has an identical normal direction, that is to say that the first and second reflective surfaces of this group are aligned parallel to one another. The light beam can be reflected back and forth between the parallel-aligned first and second reflective surfaces of the group at in each case identical angles of incidence and reflection. The identical alignment of the first and second reflective surfaces simplifies the production thereof, particularly if they are manufactured as facets on a common substrate.

Preferably, the plurality of first reflective surfaces and the plurality of second reflective surfaces are arranged in a first grid and in a second grid. The arrangement in a grid is advantageous in order to reflect the light beam on at least one of the first or of the second reflective surfaces both during a first pass and during a second pass, as was described further above.

In one development, the first grid and the second grid are aligned parallel and arranged offset with respect to one another, wherein the offset is preferably an integer fraction, in particular half, of a distance between the center points (or the vertices) of adjacent reflective surfaces of the first and second grids. In this case, the first grid and the second grid, to put it more precisely the center points or the vertices of the first and second reflective surfaces, are arranged in parallel planes. The two grids aligned parallel, which typically have first and second reflective surfaces having an identical geometry and having an identical surface area, are arranged offset with respect to one another by an integer fraction of the distance between the center points or the vertices of the first and/or second reflective surfaces in order to simplify the multiple reflection between the first and second reflective surfaces. In particular, in this way it is possible to simplify the multiple reflection between first and second surfaces of the first grid and second grid that are aligned parallel to one another, which fosters meandering passage through the reflective surfaces of the respective grid. Individual reflective surfaces, in particular arranged at the edge of the grid, can be aligned in a tilted fashion relative to the grid plane or relative to the parallel-aligned first and second reflective surfaces, in order to bring about a deflection of the light beam at the edge of the grid. The center points of said reflective surfaces also lie on the grid, that is to say that the center points of said surfaces are not offset relative to the respective grid despite the tilting. The direction along which the two grids are offset generally runs along a row or a column of a respective grid or along a direction that runs through the center points of at least two adjacent reflective surfaces.

In a further embodiment, the delay device is configured to guide the light beam on the first beam path via the first and second reflective surfaces of the first and second grids in a meandering fashion along a first direction, and it is configured to guide the light beam on the second beam path via the first and second reflective surfaces of the first and second grids in a meandering fashion along a second direction, which is different than the first direction. As was described further above in connection with the method, the light beam can pass repeatedly through the optical delay device particularly effectively in this way. In particular, the first and second reflective surfaces at which the reflection takes place along the first and second direction, respectively, can be aligned parallel to one another. It is only at the edges of the respective grid that typically first and second reflective surfaces are present which are arranged in a tilted manner relative to the parallel-aligned reflective surfaces in order to bring about a deflection of the light beam and a lateral offset in order that said light beam can pass through the grid once again along the first and respectively second direction (with an opposite beam direction).

In order to couple the light beam into the optical delay device at a suitable angle or with a suitable beam direction and at a suitable location, such that said light beam can pass through both the first beam path and the second beam path, a single input and a single output possibly suffice. In general, it is more advantageous to provide in each case separate inputs and outputs for coupling into and out of the first beam path and for coupling into and out of the second beam path.

In a further embodiment, the plurality of first reflective surfaces has a first group of first reflective surfaces and a second group of first reflective surfaces, and the plurality of second reflective surfaces has a first group of second reflective surfaces and a second group of second reflective surfaces, wherein the reflective first and second surfaces of the first group and the reflective first and second surfaces of the second group are arranged and aligned in such a way that the light beam runs along a first beam path only between reflective first and second surfaces of the first group and the light beam runs along a second beam path only between reflective first and second surfaces of the second group. In this embodiment, the light beam passes through the first and second surfaces of the respective group only once for both beam paths.

Preferably, in this embodiment, the first and second reflective surfaces of the first group are arranged in a first, inner ring region and the first and second reflective surfaces of the second group are arranged in a second, outer ring region. The center points of the reflective surfaces of the first group and the center points of the reflective surfaces of the second group in this case are typically arranged along two concentric circles. By arranging the two groups of reflective surfaces in two ring regions, despite dispensing with multiple utilization of the reflective surfaces it is possible to realize an elongation of the beam path with only slightly larger structural space. Typically, the light beam passes through adjacent first and second reflective surfaces of a respective ring region successively, that is to say that the light beam passes through the entire first or second ring region either in the clockwise direction or in the counter-clockwise direction. The light beam can pass through the first ring region and the second ring region either in the same direction or in opposite directions. A ring-shaped arrangement of the reflective surfaces has proved to be advantageous particularly when the optical delay device is used in an optical amplifier. It goes without saying that a third, fourth, . . . ring region can also be provided, which is/are arranged concentrically with respect to the first and second ring regions.

In one development, a shield, in particular in the form of a hollow cylinder, for preventing radiation from crossing from the first beam path into the second beam path, or vice versa, is arranged between the first group of reflective first and second surfaces and the second group of reflective first and second surfaces. If separate inputs and outputs are in each case provided for the first beam path and the second beam path, the shield can completely separate or shield the two beam paths from one another. If only one input and one output are provided in the delay device, it is typically necessary to provide a passage for the laser beam in the shield.

In a further embodiment, the delay device is configured to image at least one of the reflective first surfaces onto a further reflective first surface during the reflection of the light beam at one of the reflective second surfaces. As was described further above in connection with the method, it is advantageous to realize multiple imaging in the case of multiple reflection of the light beam in order to prevent the beam diameter of the light beam from increasing during the multiple reflection.

In a further embodiment, the first reflective surfaces are concavely curved. The concave curvature of the reflective surfaces makes it possible to realize multiple imaging. The second reflective surfaces, too, are typically either concavely or, if appropriate, convexly curved in order to realize multiple imaging.

In a further embodiment, the plurality of first reflective surfaces is applied on a first carrier structure, and the plurality of second reflective surfaces is applied on a second carrier structure. The surfaces of the first and second carrier structures on which the first and second reflective surfaces are applied are typically configured as planar surfaces, that is to say that the center points or the vertices of the first and second reflective surfaces are arranged in each case in a common plane. The first and second carrier structures, to put it more precisely the mutually facing surfaces of the first and second carrier structures, on which the first and second reflective surfaces are applied, are typically aligned parallel to one another.

The first and second reflective surfaces can be formed on the carrier structures in the form of mirror facets of a facet mirror, that is to say that the carrier structures form a substrate on which the reflective surfaces are produced e.g. by diamond turning. The reflective surfaces can also be configured as individual mirrors that are fixed, e.g. screwed, on the carrier structure. In order to increase the reflectivity, the individual mirrors can also be provided with a dielectric coating, as is described in WO 2012/091786 A1 cited in the introduction, which is incorporated by reference in the content of this application with regard to this aspect. The input or the inputs and the output or the outputs can be configured, e.g., in the form of openings on the carrier structures. However, it is also possible, if appropriate, to realize the input or the output by means of one or more mirrors introduced into the interspace between the first and second carrier structures. In this case, the light beam is radiated onto the mirror serving as input and is deflected e.g. by 90° onto one of the first or of the second reflective surfaces. Accordingly, the light beam can be deflected at a further mirror and be coupled out from the interspace.

In one development, the delay device comprises spacers for connecting the carrier structures whilst maintaining a predefined distance from one another. In order to enable the multiple reflection between the first and second reflective surfaces, it is necessary for the carrier structures, which are typically aligned parallel to one another, to be arranged at a predefined distance from one another.

A further aspect of the invention relates to a driver laser arrangement for an EUV (extreme ultraviolet) light source (or an EUV laser driver), comprising: at least one optical delay device as described above. In this case, the optical delay device typically serves for elongating the travel path of a laser beam, for example of a $CO_2$ laser beam, which is generated by a beam source. The optical delay device can be arranged in the beam path of the laser beam downstream of an optical switch, for example in the form of an acousto-optical modulator, in order to elongate the travel path of the laser beam and in this way to obtain enough time for switching over the optical switch, such that a back-reflection generated at a target material can be blocked by the optical switch. In this case, the laser beam can pass through the two beam paths of the delay device directly successively. However, it is also possible, between passing through the first beam path of the delay device and passing through the second beam path of the delay device, for the laser beam to be guided through one or more optical components in which the properties of the laser beam are altered. By way of example, the laser beam can be amplified in an optical amplifier between the first pass and the second pass. The optical delay device can also be used in an optical amplifier of the driver laser arrangement. In this case, a typically gaseous amplifier medium, for example in the form of $CO_2$ gas, is introduced into the interspace between the first and second reflective surfaces.

Further advantages of the invention are evident from the description and the drawing. Likewise, the features mentioned above and those that will further be presented can be used in each case by themselves or as a plurality in any desired combinations. The embodiments shown and described should not be understood to be an exhaustive enumeration, but rather are of exemplary character for outlining the invention.

DESCRIPTION OF DRAWINGS

FIGS. 3A and 3B show schematic illustrations of a first and second square grid having first and second reflective surfaces (FIG. 3A) and of two meandering beam paths along two different directions at the second grid (FIG. 3B).

FIGS. 4A and 4B show schematic illustrations of the two grids from FIG. 3A arranged one above the other and having two and respectively three meandering beam paths along two and respectively three directions rotated with respect to one another.

DETAILED DESCRIPTION

In the following description of the drawings, identical reference signs are used for identical or functionally identical component parts.

Figure 1A:
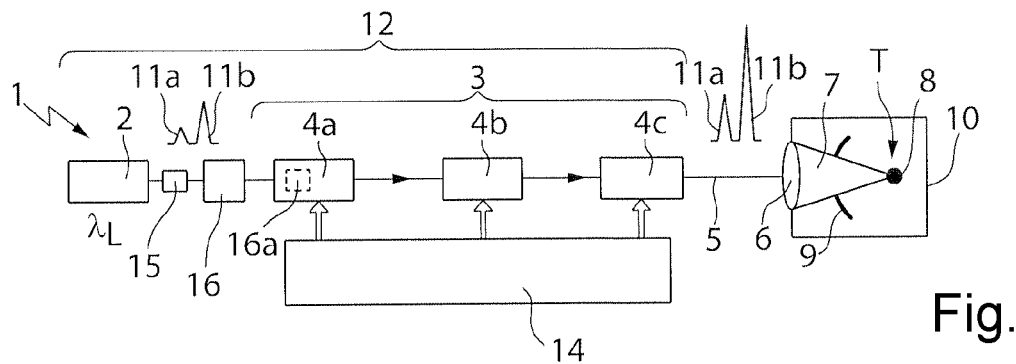
FIGS. 1A and 1B show schematic illustrations of two exemplary embodiments of a driver laser arrangement for an EUV light source, comprising two and one optical delay device(s), respectively.

FIG. 1A shows highly schematically an EUV light source 1 comprising a beam source 2, an amplifier arrangement 3 having three optical amplifiers 4a, 4b, 4c or amplifier stages, a beam guiding device 5 (not illustrated in more specific detail) and a focusing device in the form of a focusing lens 6. The focusing lens 6 serves to focus a pulsed light beam in the form of a laser beam 7, which light beam is generated by the beam source 2 and amplified by the amplifier arrangement 3, at a target region or at a target position T, at which a target material 8 is introduced. Upon irradiation with the laser beam 7, the target material 8 undergoes transition to a plasma state and emits EUV radiation in the process, said radiation being focused by means of a collector mirror 9.

In the example shown in FIG. 1A, the collector mirror 9 has an opening for the passage of the laser beam 7 and the focusing lens 6 separates a vacuum chamber 10, in which the target material 8 is arranged, from the beam guiding device 5. In the example shown, the beam source 2 comprises a $CO_2$ laser to generate in short temporal succession a first pulse 11a (pre-pulse) and a second pulse 11b (main pulse), which are jointly amplified in the amplifier arrangement 3 and focused onto the target material 8 or into the region of the target position T. The beam source 2 together with the amplifier arrangement 3 forms a driver laser arrangement 12 of the EUV light source 1.

The wavelength $\lambda_L$ of the laser beam 7 which is generated by the beam source 2 is constant and is approximately 10.6 µm in the example shown of a beam source 2 in the form of a $CO_2$ laser. As can be discerned on the basis of the pulse heights in FIG. 1A, the two pulses 11a, 11b are generated by the beam source 2 with different powers and are amplified in the three optical amplifiers 4a-c of the amplifier arrangement 3. To prevent a situation in which a back-reflection of the amplified laser beam 7, said back-reflection being generated at the target material 8, enters the beam source 2 in the opposite direction after passing through the amplifier arrangement 3, an acousto-optical modulator 15 is arranged in the beam path of the laser beam 7 between the beam source 2 and the first amplifier 4a of the amplifier arrangement 3. The acousto-optical modulator 15 can serve as an optical switch and block the beam path of the laser beam 7 propagating back to the beam source 2. For this purpose, the acousto-optical modulator 15 can be configured to be switched over within a switchover time from a first switching position, in which the pulsed laser beam 7 is transmitted, to a second switching position, in which the pulsed laser beam 7 is blocked. Said switchover time can be shorter than the time period required by the laser beam 7 from the acousto-optical modulator 15 to the target material 8 and back. In order to elongate the beam path of the laser beam 7, an optical delay device 16 is arranged in the beam path downstream of the acousto-optical modulator 15 in the case of the EUV light source 1 shown in FIG. 1A.

Figure 1B:
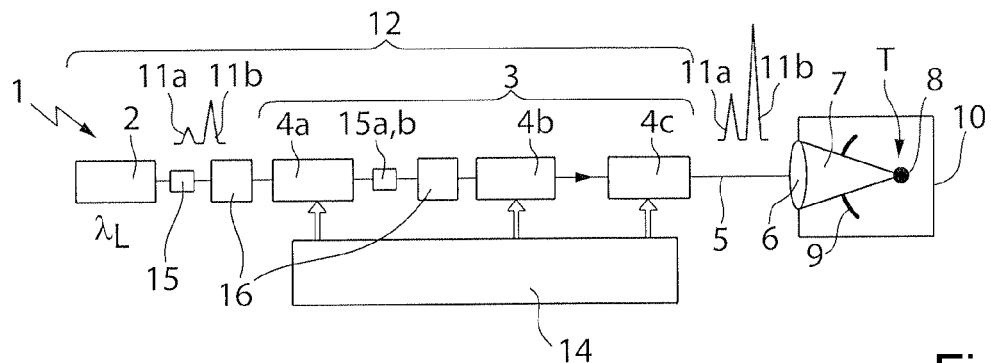

FIG. 1B illustrates a further example of an EUV light source 1 which differs from the EUV light source 1 from FIG. 1A in that two further acousto-optical modulators 15a, 15b are arranged between the first optical amplifier 4a and the second optical amplifier 4b. In the example shown in FIG. 1B, the laser beam 7 passes through the optical delay device 16 a first time and a second time, where the laser beam 7 is amplified in the first optical amplifier 4a between the first and second passes through the delay device 16. In contrast to the illustration shown in FIG. 1A, the second pass of the laser beam 7 through the optical delay device 16 can be effected between the two acousto-optical modulators 15a, 15b.

Figure 2:
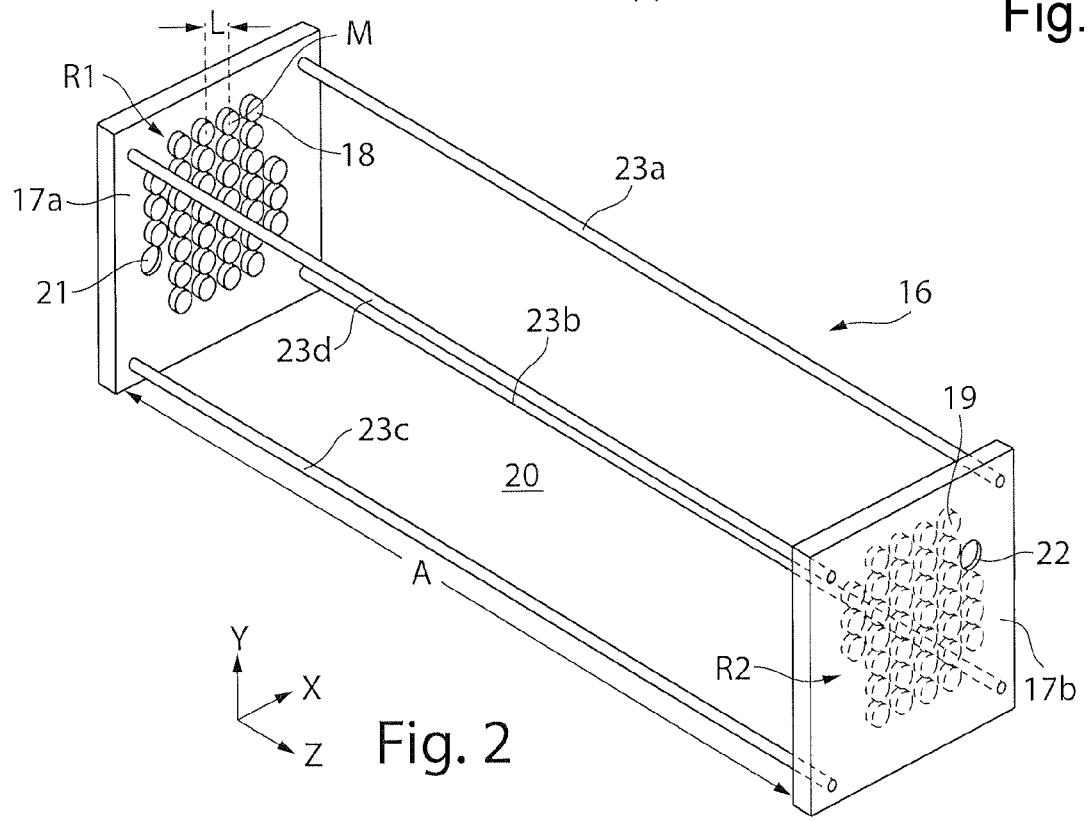
FIG. 2 shows a schematic illustration of a first exemplary embodiment of an optical delay device with first and second reflective surfaces arranged in a first grid and a second grid, offset with respect to the first grid.

FIG. 2 shows the optical delay device 16 from FIGS. 1A and 1B in a three-dimensional view. The optical delay device 16 comprises two carrier structures 17a,b in the form of carrier plates. A plurality of first reflective surfaces 18 arranged in a first square grid R1 are formed on the first carrier structure 17a. Correspondingly, a plurality of second reflective surfaces 19 arranged in a second square grid R2 are formed on the second carrier structure 17b. In the example shown, the first and second reflective surfaces 18, 19 are configured as individual mirrors having a circular geometry which are fixed on the planar surfaces of the carrier structures 17a,b, e.g., with the aid of screws or the like.

An interspace 20 is formed between the two carrier structures 17a,b and thus between the first and second reflective surfaces 18, 19, into which interspace the laser beam 7 is coupled at an input 21 in the form of a through opening formed in the first carrier structure 17a and is coupled out via an output 22, likewise configured in the form of a through opening, said output being formed at the second carrier structure 17b opposite the first carrier structure. In the example shown, the two carrier structures 17a,b are connected to one another via four rod-shaped spacers 23a-d aligned parallel to one another, in order to keep the two carrier structures 17a,b at a desired distance A from one another.

The center points M of adjacent circular first and second reflective surfaces 18, 19 are arranged at a distance L from one another both in the horizontal direction (X-direction) and in the vertical direction (Y-direction), said distance corresponding to the grid spacing or the lattice spacing of the first and second grids R1, R2 in the X-direction and in the Y-direction, respectively. The second grid R2 is arranged offset in the X-direction relative to the first grid R1, where the offset corresponds to half of the distance L, i.e., L/2, between adjacent first and second reflective surfaces 18, 19 of the first and second grids R1, R2, as can readily be discerned in particular in FIG. 3A, which shows a detail of a first grid R1 and a detail of an opposite second grid R2 in each case in a plane view.

The first and second reflective surfaces 18, 19 of the first and second grids R1, R2 in FIG. 3A differ from the first and second reflective surfaces 18, 19 in FIG. 2 in that these have a square geometry and are arranged (approximately) directly adjacent to one another. The first and second reflective surfaces 18, 19 shown in FIG. 3A are mirror facets formed on a common substrate (not shown in FIG. 3A) that is applied on a carrier structure 17a,b. The substrate can be fixed on the carrier structure 17a,b like a single large reflective surface or like an individual mirror by means of a single fixing/adjustment method, e.g., with the aid of screws. The mirror facets 18, 19 can be produced on the substrate, which may include copper, for example, by means of surface processing, for example by means of diamond turning. If appropriate, a reflection-enhancing coating can be applied on the first and second reflective surfaces 18, 19.

For the production of the first and second reflective surfaces 18, 19 in the form of mirror facets, it has proved to be advantageous if the largest possible number of first and second reflective surfaces 18, 19 have an identical alignment, e.g., the same normal direction, which in the example shown corresponds to the Z-direction along which the two parallel-aligned grids R1, R2 or the two carrier structures 17a,b are arranged at a distance from one another. In the case of the grids R1, R2 shown in FIG. 3A, all parallel-aligned first and second surfaces 18, 19 form a group G. In FIG. 3A, surfaces 18, 19 associated with the group G are clarified by the fact that they are illustrated as non-hatched surfaces. The first and second surfaces 18, 19 associated with the group G form a proportion of more than 50%, in the example shown more than 80%, of the total number of first and second reflective surfaces 18, 19 of the respective grids R1, R2. The only reflective surfaces which do not belong to the group G with identical alignment are first and second reflective surfaces 18, 19—illustrated in a hatched manner in FIG. 3A—which are arranged at the edge of the respective grid R1, R2 and which serve for deflecting the laser beam 7, as is described in greater detail further below.

The optical delay device 16 shown in FIG. 2 and in FIG. 3A is configured in such a way that the laser beam 7 is guided in the interspace 20 between the input 21 and the output 22 on a first beam path S1 and in the interspace 20 (if appropriate between a further input and a further output) also on a second geometrical beam path S2, which is different than the first beam path. For guiding the laser beam 7 along two different geometrical beam paths S1, S2, besides the possibly required provision of a further input and output on the optical delay device 16, which can be realized, e.g., by introducing further through openings in the carrier structures 17a,b, a suitable alignment of the lateral first and second reflective surfaces 18, 19 (illustrated in a hatched manner) relative to the XY plane and also an offset of the first and second grids R1, R2 are required.

As is indicated with the aid of dashed lines in FIG. 3A, in the first beam path S1, the laser beam 7 is reflected from a first reflective surface 18a of the first grid R1 to a second reflective surface 19a of the second grid R2 and is reflected back from the latter to a surface 18b of the first grid R1 that is adjacent in the X-direction. Such a reflection between adjacent first surfaces 18a,b of the first grid R1 (and analogously between adjacent second surfaces 19a,b of the second grid R2) typically takes place, in the first beam path S1, row by row (i.e., in the X-direction) between all reflective first and second surfaces 18, 19 which belong to the group G of identically aligned reflective surfaces 18, 19.

As is indicated in FIG. 3A, the first beam path S1 at the edge of the first grid R1 and respectively the second grid R2 does not run between adjacent first and respective second reflective surfaces 18, 19, but rather between first and second reflective surfaces 18, 19 which are not directly adjacent in the square grid and which are arranged in different rows of the grid R1, R2. In this way, the laser beam 7 can pass through the respective grid R1, R2 in a meandering fashion along the first beam path S1, as is indicated in FIG. 3B.

In contrast to the first beam path S1, the laser beam 7 passes through the first grid R1 and respectively the second grid R2 along the second beam path S2 not row by row in the X-direction, but rather along a direction U rotated by 60° with respect thereto (cf. FIG. 3B). The second beam path S2 likewise runs in a meandering fashion along the direction U rotated relative to the respective grid R1, R2, i.e., not along the rows and columns of the respective grid R1, R2, as is the case for the first beam path S1. Therefore, the second beam path S2 runs not only at the edges of the respective grid R1, R2 between non-adjacent first and second reflective surfaces 18, 19, but also between those of the first and second reflective surfaces 18, 19 which belong to the group G and are thus aligned identically.

By way of example, FIG. 3A shows part of the second beam path S2 from a first reflective surface 18c of the first grid R1, from which surface the laser beam 7 is guided along the second beam path S2 to the same second reflective surface 19a as in the case of the first beam path S1. The laser beam 7 is reflected back from this second reflective surface 19a along the second beam path S2 to a further, non-adjacent first reflective surface 18d. As is evident in FIG. 3B, for the second meandering beam path S2 at the respective upper and lower edges of the grids R1, R2 two rows (not illustrated in FIG. 3B) having first and second reflective surfaces 18, 19 are additionally required, through which typically only the second beam path S2 passes, but not the first beam path S1. By contrast, the laser beam 7 in both beam paths S1, S2 passes through a portion of the reflective surfaces of the three rows of the respective grids R1, R2 illustrated in FIG. 3B.

FIGS. 4A and 4B show an excerpt from the first and second grids R1, R2—illustrated one above the other—from FIGS. 3A and 3B with a first and second beam path S1, S2 (cf. FIG. 4A) and with a third beam path S3 (cf. FIG. 4B).

The third beam path S3 passes through the first and second reflective surfaces 18, 19 in a meandering fashion along a third direction V, which is rotated by 120° relative to the direction X of the first beam path S1 and by 60° relative to the direction U of the second beam path S2. In the case of the arrangement indicated in FIG. 4A, not all of the first and second reflective surfaces 18, 19 of the bottommost row and of the topmost row (not illustrated in FIG. 4A) of the respective grids R1, R2 can be utilized for the second beam path S2, and so these can, if appropriate, be omitted or be utilized for the third beam path S3. In the case of the arrangement illustrated in FIG. 4B, by contrast, the second beam path S2 and the third beam path S3 respectively pass through in each case half of the first and second reflective surfaces 18, 19, such that these contribute to the elongation of the respective second and third beam paths S2, S3 of the laser beam 7.

The respective directions X, U, V of the meandering beam paths S1, S2, S3 need not necessarily be aligned at 60° with respect to one another; it is for example also possible, depending on the geometry of the respective grids R1, R2, to choose the directions X, U, V of the meandering beam paths S1, S2, S3 to be perpendicular to one another, as is described below on the basis of two hexagonal grids R1, R2 shown in FIGS. 5A and 5B.

Figure 5A:
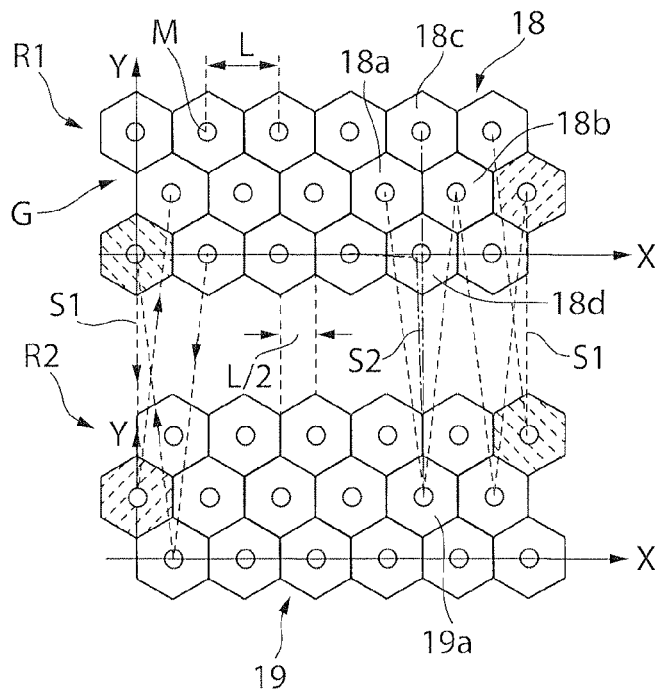
FIGS. 5A and 5B show schematic illustrations of a first and second hexagonal grid having first and second reflective surfaces (FIG. 5A) and of two meandering beam paths along two mutually perpendicular directions at the second grid (FIG. 5B).
Figure 5B:
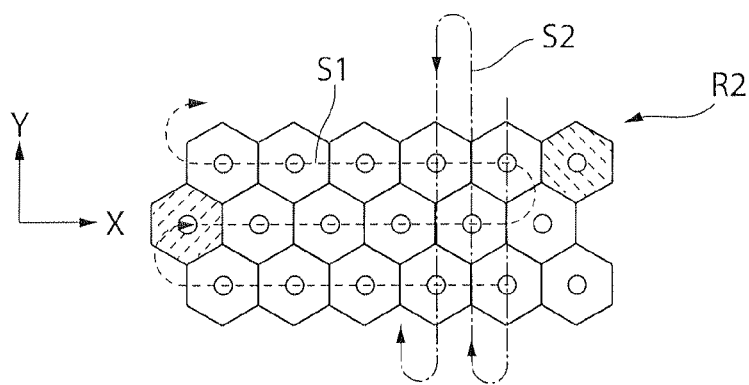

The two hexagonal grids R1, R2 from FIGS. 5A and 5B, analogously to the square grids R1, R2 shown in FIGS. 3A and 3B, are displaced in the X-direction by half of the distance L (i.e., L/2) between the center points M of adjacent first and second reflective surfaces 18, 19. As was described further above in connection with FIGS. 3A and 3B, the laser beam 7 passes through the first and second grids R1, R2 on the first beam path S1 in a meandering fashion along the X-direction, i.e., along the rows of the respective grids R1, R2. The second beam path S2 runs along the first and second reflective surfaces 18, 19 in a manner rotated by 90°, i.e., along the Y-direction, as can be discerned in FIG. 5B. As a result of the perpendicular alignment shown in FIGS. 5A and 5B, it is possible to realize a strict separation of the meandering beam paths S1, S2 and thus to avoid crosstalk from one beam path S1 into the other beam path S2. In this case, the input 21 and the output 22 of the delay device 16 can be arranged in a manner separated far from one another spatially and in the beam propagation direction, without further optical elements having to be provided in the delay device 16 for this purpose.

As in FIGS. 3A and 3B, in FIGS. 5A and 5B, too, the laser beam 7 along the first beam path S1, during the first pass, is reflected from one of the first reflective surfaces 18a to one of the second reflective surfaces 19a which belongs to the same row of the second grid R2 as the first reflective surface 18a. The laser beam 7 is reflected from the second reflective surface 19a to an adjacent first reflective surface 18b of the first grid R1 that is arranged in the same row. As in the case of the square grids R1, R2 from FIGS. 3A and 3B, in the case of the hexagonal grids R1, R2 from FIGS. 5A and 5B, too, during the second pass along the second beam path S2 the laser beam 7 is reflected from a further one of the first reflective surfaces 18c to the same second reflective surface 19a of the second grid R2 and back from the latter to a further, non-adjacent first reflective surface 18d. Both in the example illustrated in FIGS. 3A and 3B and in the example illustrated in FIGS. 5A and 5B, the non-adjacent first reflective surfaces 18c, 18d are arranged in two rows lying above and respectively below that row in which is arranged the second reflective surface 19a to and from which the laser beam 7 is reflected.

As in the example shown in FIGS. 3A and 3B, in the example shown in FIGS. 5A and 5B, too, the first and second reflective surfaces 18, 19 which belong to the group G having identically aligned first and second reflective surfaces 18, 19 are illustrated in a non-hatched manner, while those reflective surfaces 18, 19 which are tilted to the plane of the drawing or with respect to the XY plane are illustrated in a hatched manner. A deflection or reflection between different rows of the respective grids R1, R2 takes place at the first and second surfaces 18, 19 illustrated in a hatched manner.

Figure 6:
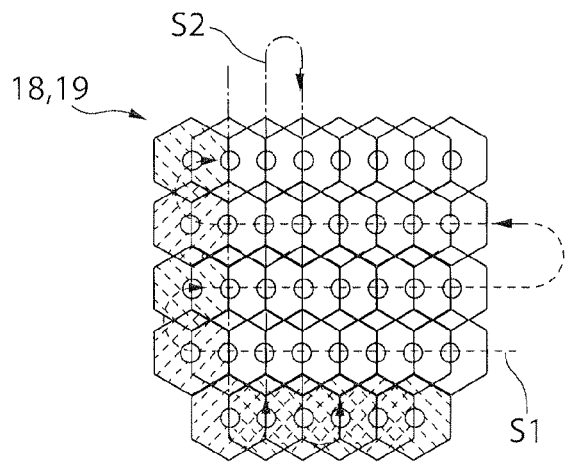
FIG. 6 shows schematic illustrations of the two grids from FIG. 5A arranged one above the other and having two meandering beam paths along two mutually perpendicular directions.

FIG. 6 illustrates the first and second reflective surfaces 18, 19 of a lower left partial region of the two hexagonal grids R1, R2 one above the other. As can readily be discerned in FIG. 6, the first and second surfaces 18, 19 along the lateral edges of the two hexagonal grids R1, R2 are tilted relative to the XY plane in order to bring about the meandering deflection of the respective beam path S1, S2.

Figure 7:
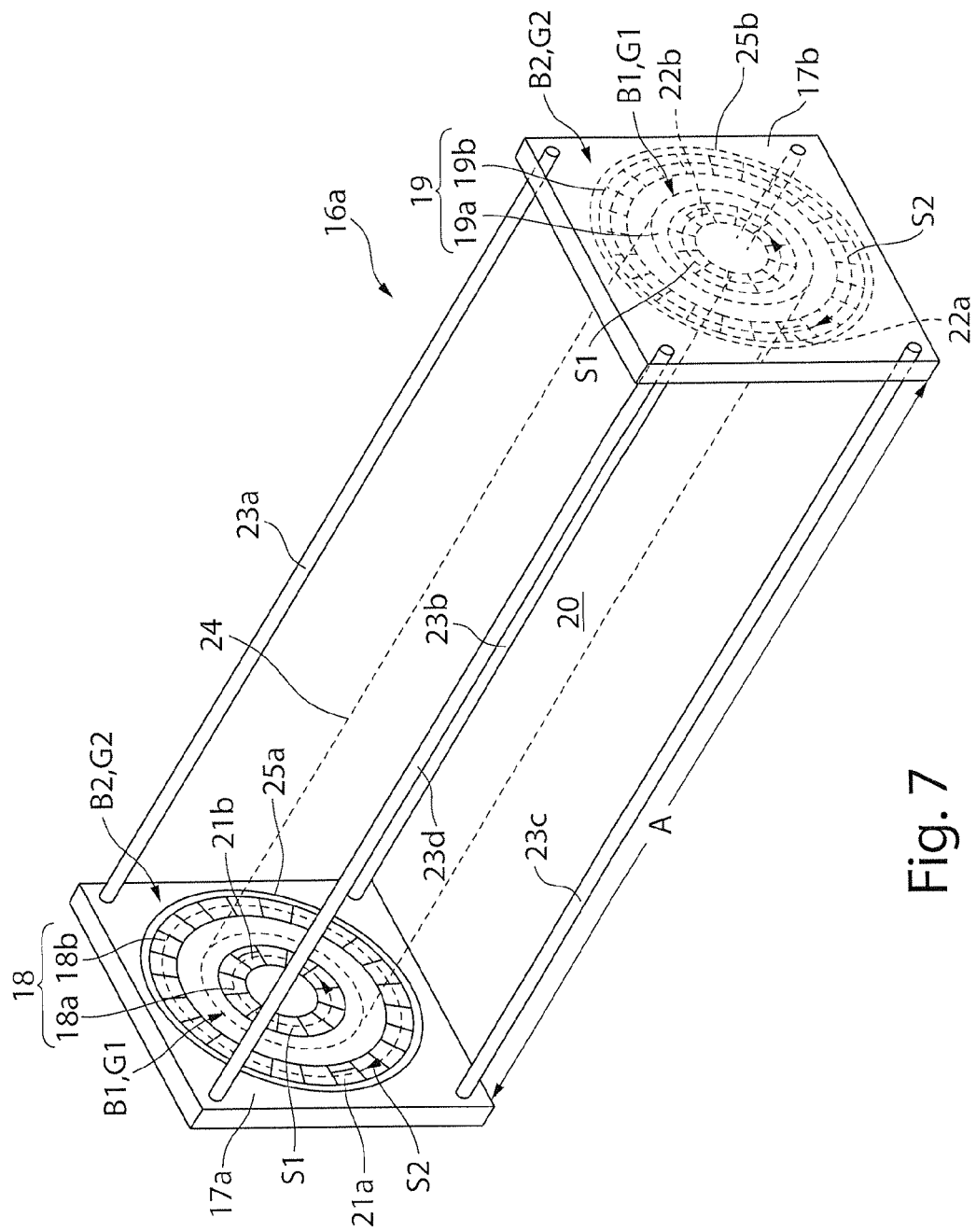
FIG. 7 shows a schematic illustration of a second exemplary embodiment of an optical delay device with first and second reflective surfaces arranged in a first, inner ring region and in a second, outer ring region.

Finally, FIG. 7 shows an optical delay device 16a that differs from the delay device 16 shown in FIG. 2 essentially in that the first and second reflective surfaces 18, 19 are not arranged in a first and second grid R1, R2, but rather in a first and second ring region B1, B2 in each case on a common substrate 25a,b. The first, inner ring region B1 and the second, outer ring region B2 are arranged concentrically with respect to one another. The plurality of first reflective surfaces 18 is subdivided by the ring regions B1, B2 into a first group G1 of first reflective surfaces 18a which belong to the first ring region B1, and into a second group G2 of reflective surfaces 18b which belong to the second ring region B2. Correspondingly, the second reflective surfaces 19 are subdivided into a first group G1 of second reflective surfaces 19a which belong to the first ring region B1, and into a second group G2 of second reflective surfaces 19b which belong to the second ring region B2.

The first and second reflective surfaces 18, 19 of the first and second ring regions B1, B2 are arranged and aligned in such a way that the laser beam 7 is reflected back and forth only between the first and second reflective surfaces 18a, 19a of the first ring region B1 or only between the first and second reflective surfaces 18a, 19a of the second ring region B2. In the example shown in FIG. 7, therefore, the laser beam 7 passes through none of the first and second reflective surfaces 18, 19 of the two ring regions B1, B2 on more than one beam path S1, S2. In the example shown in FIG. 7, the reflective surfaces 18, 19 are formed in the form of mirror facets on the respective substrate 25a,b composed of copper. The reflective surfaces 18, 19 form circle sectors of the respective ring regions B1, B2 and can be produced for example by diamond processing of the substrate 25a,b, as described above.

As can be discerned in FIG. 7, two inputs 21a,b in the form of through openings are configured on the first carrier structure 17a. Analogously, two outputs 22a,b in the form of two through openings are configured on the second carrier structure 17b. The first input 21a and the first output 22a replace one of the mirror facets of the reflective surfaces 18a, 19a of the first ring region B1. Correspondingly, the second input 21b and the second output 22b replace one of the mirror facets of the reflective surfaces 18b, 19b of the second ring region B2. In this case, the first and the second beam paths S1 and S2, respectively, run between the first and second inputs 21a and 21b, respectively, and the first and second outputs 22a and 22b, respectively. This is advantageous particularly if a shield 24 in the form of a hollow cylinder is fitted in the interspace 20, which shield separates the first ring region B1 from the second ring region B2 in a substantially light-tight manner, as is indicated by dashed lines in FIG. 7. Alternatively, if appropriate, provision may be made of just a single input for coupling the two beam paths S1, S2 into the interspace 20 of the optical delay device 16a and a single output for coupling out the two beam paths S1, S2 from the interspace 20 of the optical delay device 16a.

In the example shown, the laser beam 7 passes through the reflective first and second surfaces 18a, 19a of the first ring region B1 along the first beam path S1 in the counterclockwise direction and the first and second reflective surfaces 18b, 19b of the second beam path S2 in the clockwise direction. It goes without saying that the laser beam 7 can alternatively also pass through the reflective surfaces 18a, 19a, 18b, 19b of the first and second ring regions B1, B2 in the same direction along the first and second beam paths S1, S2. The position of the respective first and second reflective surfaces 18a, 19a, 18b, 19b in the circumferential direction at which the laser beam 7 is coupled in and coupled out can correspond for the first and second beam paths S1, S2 in the circumferential direction. Alternatively, the positions in the circumferential direction at which the coupling in and the coupling out take place can be chosen differently for the first and second beam paths S1, S2, in order in this way to be able to geometrically separate the two beam paths S1, S2 even more simply, as is illustrated in FIG. 7.

The optical delay device 16a shown in FIG. 7 can be integrated in particular into one of the optical amplifiers 4a-c from FIGS. 1A and 1B, for example into the first optical amplifier 4a (cf. FIG. 1A). In this case, a typically gaseous gain medium, in the form of $CO_2$ gas in the example shown, is introduced in the interspace 20. It goes without saying that instead of first and second reflective surfaces 18, 19 in the form of individual mirrors, the first and second reflective surfaces 18, 19 can be configured in the form of mirror facets in the case of the delay device 16a shown in FIG. 7 as well.

In the examples described here, typically at least the first reflective surfaces 18 or at least the second reflective surfaces 19 are concavely curved in order, upon reflection at a respective opposite second or first reflective surface 19, 18, to image the laser beam 7 onto a further reflective first or second reflective surface 18, 19. In the example described in FIG. 2, where the first and second reflective surfaces 18, 19 are arranged in each case in a grid R1, R2, typically both the first and the second reflective surfaces 18, 19 are concavely curved. In the example shown in FIG. 7 by contrast, generally the second reflective surfaces 19 are convexly curved. It goes without saying that—apart from the curvature—there is no fundamental difference between the first reflective surfaces 18 and the second reflective surfaces 19.

Instead of applying the first and second reflective surfaces 18, 19 on the planar surfaces of carrier structures 17a,b, alternatively it is also possible, if appropriate, to provide the carrier structures 17a,b themselves with a concave or, if appropriate, convex curvature. In general, for the multiple imaging in the case of the application described here, however, it is necessary for the first and second reflective surfaces 18, 19 to have a dedicated curvature which is greater than a possibly present curvature of the respective carrier structures 17a,b in order in this way to be able to maintain the beam diameter of the laser beam 7 in the course of the elongation of the beam path S1, S2.

In the manner described further above, a laser beam can pass through one and the same delay device 16, 16a in at least a first and a second pass along different geometrical beam paths S1, S2, . . . , as a result of which the structural space of the optical delay device 16, 16a that is required for the elongation of the beam path S1, S2, . . . is comparatively small. The alignment of the first and second reflective surfaces 18, 19 in the optical delay device 16, 16a is typically fixedly predefined, that is to say that generally it is not possible to alter the alignment of the first and second reflective surfaces 18, 19 during the operation of the optical delay device 16, 16a.

A number of embodiments of the invention have been described. Nevertheless, it will be understood that various modifications may be made without departing from the spirit and scope of the invention. Accordingly, other embodiments are within the scope of the following claims.

What is claimed is:

1. A method of elongating a beam path of a light, comprising:
   coupling the light beam into an interspace between a plurality of first reflective surfaces and a plurality of second reflective surfaces facing the first reflective surfaces;
   multiply reflecting the light beam between the first reflective surfaces and the second reflective surfaces to elongate the beam path of the light beam; and
   coupling out the light beam from the interspace,
   wherein alignment of the first reflective surfaces and the second reflective surfaces is fixed,
   wherein the light beam undergoes the coupling in, repeated reflecting and coupling out at least a first time with a first pass and a second time with a second pass,
   wherein the light beam is coupled through a first input into the interspace, traverses a first beam path in the interspace, and is coupled out through a first output from the interspace during the first pass, and, after the first pass, the light beam is coupled through a second input into the interspace, traverses a second beam path in the interspace, and is coupled out through a second output from the interspace during the second pass, the second input being different from the first input, the second output being different from the first output, the second beam path being different from the first beam path, and
   wherein the light beam is reflected by one or more of the first reflective surfaces doubly during both the first pass and the second pass, or one or more of the second reflective surfaces doubly during both the first pass and the second pass, or both of the one or more of the first reflective surfaces and the one or more of the second reflective surfaces doubly during both the first pass and the second pass.

2. The method of claim 1, wherein at least one the first reflective surfaces is imaged onto a further first reflective surface during a reflection of the light beam at one of the second reflective surfaces.

3. The method of claim 1, wherein the plurality of first reflective surfaces and the plurality of second reflective surfaces are arranged in a first grid and in a second grid, respectively, in which the light beam passes in a meandering fashion.

4. The method of claim 3, wherein a direction along which the light beam passes through the first and second reflective surfaces of the first and second grids in a first meandering fashion during the first pass differs from a direction along which the light beam passes through the first and second reflective surfaces of the first and second grids in a second meandering fashion during the second pass.

5. The method of claim 1, wherein, during the first pass, the light beam is reflected from one of the first reflective surfaces to one of the second reflective surfaces and back from the one of the second reflective surfaces to a further first reflective surface adjacent to the one of the first reflective surfaces, and Am wherein, during the second pass, the light beam is reflected from another one of the first reflective surfaces to the same one of the second reflective surfaces and back from the same one of the second reflective surfaces to another further first reflective surface that is non-adjacent to the another one of the first reflective surfaces.

6. The method of claim 1, wherein, after the first pass, the light beam is deflected from the first output to the second input to start the second pass.

7. The method of claim 1, further comprising:
altering one or more properties of the light beam between the first pass and the second pass.

8. An optical delay device for elongating a beam path of a light beam, comprising:
a plurality of first reflective surfaces;
a plurality of second reflective surfaces facing the first reflective surfaces;
a first input and a second input for coupling the light beam into an interspace formed between the first reflective surfaces and the second reflective surfaces, the second input being different from the first input; and
a first output and a second output for coupling out the light beam from the interspace after the elongating of the beam path of the light beam by multiple reflections at the first reflective surfaces and at the second reflective surfaces, the second output being different from the first output,
wherein alignment of the first reflective surfaces and the second reflective surfaces is fixed,
wherein the optical delay device is configured to guide the light beam between the first input and the first output on a first beam path during a first pass and, after the first pass, to guide the light beam between the second input and the second output on a second beam path during a second pass, through the interspace between the first reflective surfaces and the second reflective surfaces, the second beam path being different from the first beam path, and
wherein the light beam is reflected by one or more of the first reflective surfaces doubly during both the first pass and the second pass, or one or more of the second reflective surfaces doubly during both the first pass and the second pass, or both of the one or more of the first reflective surfaces and the one or more of the second reflective surfaces doubly during both the first pass and the second pass.

9. The optical delay device of claim 8, wherein a group of first and second reflective surfaces has an identical normal direction, and
wherein a number of the group of the first and second reflective surfaces is more than 50% of a total number of the first and second reflective surfaces.

10. The optical delay device of claim 8, wherein the plurality of first reflective surfaces and the plurality of second reflective surfaces are arranged in a first grid and in a second grid, respectively.

11. The optical delay device of claim 10, wherein the first grid and the second grid are aligned in parallel and arranged offset with respect to one another, and
wherein the offset is an integer fraction of a distance between center points of adjacent reflective surfaces of the first grid and the second grid.

12. The optical delay device of claim 11, wherein the offset is a half of the distance.

13. The optical delay device of claim 10, configured to:
guide the light beam on the first beam path via the first and second reflective surfaces of the first and second grids in a first meandering fashion along a first direction; and
guide the light beam on the second beam path via the first and second reflective surfaces of the first and second grids in a second meandering fashion along a second direction that is different than the first direction.

14. The optical delay device of claim 8, wherein the plurality of first reflective surfaces has a first group of first reflective surfaces and a second group of first reflective surfaces, and the plurality of second reflective surfaces has a first group of second reflective surfaces and a second group of second reflective surfaces, and
wherein the first group of first reflective surfaces, the first group of second reflective surfaces, the second group of first reflective surfaces, and the second group of second reflective surfaces are arranged and aligned, such that the light beam runs along a first beam path only between the first group of first reflective surfaces and the second group of second reflective surfaces and the light beam runs along a second beam path only between the second group of first reflective surfaces and the second group of second reflective surfaces.

15. The optical delay device of claim 14, wherein the first group of first reflective surfaces and the first group of second reflective surfaces are arranged in a first, inner ring region, and the second group of first reflective surfaces and the second group of second reflective surfaces are arranged in a second, outer ring region.

16. The optical delay device of claim 14, wherein a shield for preventing radiation from crossing from the first beam path into the second beam path, or vice versa, is arranged between the first group of first and second reflective surfaces and the second group of reflective first and second surfaces.

17. The optical delay device of claim 8, configured to image at least one of the first reflective surfaces onto a further first reflective surface during a reflection of the light beam at one of the reflective second surfaces.

18. The optical delay device of claim 8, wherein the plurality of first reflective surfaces is concavely curved.

19. The optical delay device of claim 8, wherein the plurality of first reflective surfaces is applied on a first carrier structure, and wherein the plurality of second reflective surfaces is applied on a second carrier structure.

20. The optical delay device of claim 19, further comprising spacers for connecting the first and second carrier structures and maintaining a predefined distance between the first and second carrier structures.

21. An EUV laser driver comprising:
at least one optical delay device for elongating a beam path of a light beam, comprising:
a plurality of first reflective surfaces;
a plurality of second reflective surfaces facing the first reflective surfaces;
a first input and a second input for coupling the light beam into an interspace formed between the first reflective surfaces and the second reflective surfaces, the second input being different from the first input; and
a first output and a second output for coupling out the light beam from the interspace after the elongating of the beam path of the light beam by multiple reflection at the first reflective surfaces and at the second reflective surfaces, the second output being different from the first output, wherein alignment of the first reflective surfaces and the second reflective surfaces in the optical delay device is fixed, wherein the optical delay device is configured to guide the light beam between the e first input and the first output on a first beam path during a first pass and, after the first pass, to guide the light beam between the second input and the second output on a second beam path during a second pass through the interspace between the first reflective surfaces and the second reflective surfaces, the second beam path being different from the first beam path, and wherein the light beam is reflected by one or more of the first reflective surfaces doubly during both the first pass and the second pass, or one or more of the second reflective surfaces doubly during both the first pass and the second pass, or both of the one or more of the first reflective surfaces and the one or more of the second reflective surfaces doubly during both the first pass and the second pass.

\* \* \* \* \*